United States Patent [19]

Gaffney, Jr.

[11] Patent Number: 4,562,305

[45] Date of Patent: Dec. 31, 1985

[54] SOFTWARE CRYPTOGRAPHIC APPARATUS AND METHOD

[75] Inventor: John E. Gaffney, Jr., Bethesda, Md.

[73] Assignee: International Business Machines Corporation, Armonk, N.Y.

[21] Appl. No.: 452,248

[22] Filed: Dec. 22, 1982

[51] Int. Cl.[4] .............................................. H04L 9/02
[52] U.S. Cl. .............................. 178/22.08; 178/22.09
[58] Field of Search ........................... 178/22.08, 22.09

[56] References Cited

U.S. PATENT DOCUMENTS

| | | | |
|---|---|---|---|
| 3,996,449 | 12/1976 | Attanasio et al. | 235/61.7 |
| 4,120,030 | 10/1978 | Johnstone | 364/200 |
| 4,168,396 | 9/1979 | Best | 178/22 |
| 4,183,085 | 1/1980 | Roberts et al. | 364/200 |
| 4,465,901 | 8/1984 | Best | 178/22.08 |
| 4,471,163 | 9/1984 | Donald | 178/22.08 |

Primary Examiner—Salvatore Cangialosi
Assistant Examiner—Aaron J. Lewis
Attorney, Agent, or Firm—John E. Hoel

[57] ABSTRACT

An improved software cryptographic apparatus and method are disclosed. The apparatus and method enables the encryption of the object code of a program so as to enable relocatable code operations. The apparatus and method will adapt program execution for a mixture of encrypted and nonencrypted code. A particular advantage of the apparatus and method is its accommodation of interrupts and branches while carrying out the cryptographic function.

3 Claims, 1 Drawing Figure

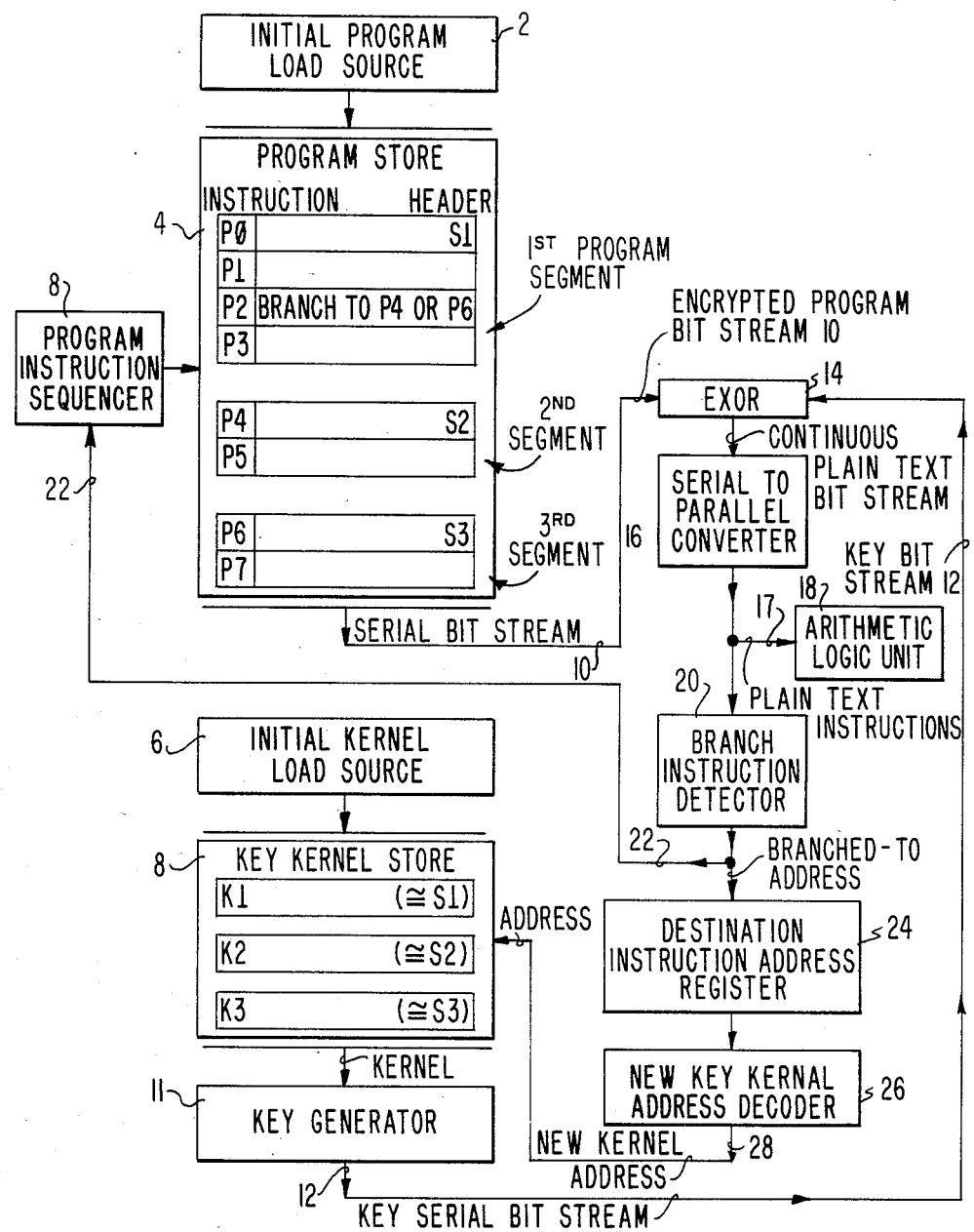

SOFTWARE CRYPTOGRAPHIC APPARATUS AND METHOD

FIELD OF THE INVENTION

The invention disclosed broadly relates to cryptographic techniques and more particularly relates to an improved software cryptographic apparatus and method.

BACKGROUND OF THE INVENTION

U.S. Pat. No. 4,168,396 to Best discloses a microprocessor for executing enciphered programs. Computer programs which have been enciphered during manufacture to deter the execution of the programs in unauthorized computers, must be decrypted before execution. The disclosed microprocessor deciphers and executes an enciphered program one instruction at a time, instead of on a continuous basis, through a combination of substitutions, transpositions, and exclusive OR additions, in which the address of each instruction is combined with the instruction. Each unit may use a unique set of substitutions so that a program which can be executed on one microprocessor cannot be run on any other microprocessor. Further, Best cannot accommodate a mixture of encrypted and plain text programs.

U.S. Pat. No. 4,120,030 to Johnstone describes a computer in which the data portion of instructions are scrambled and in which the data is of necessity stored in a separate memory. There is no disclosure of operating with instructions which are completely encrypted with both the operation code and the data address portion being unreadable without a corresponding key kernel.

U.S. Pat. No. 4,183,085 describes a technique for protecting software by providing two separate program storages. The first program storage is a secure storage and the second program storage is a free storage. Security logic is provided to check whether an output instruction has originated in the secure store and to prevent operation of an output unit which receives output instructions from the free storage. This makes it difficult to produce information by loading a program into free storage.

U.S. Pat. No. 3,996,449 entitled "Operating System Authenticator," discloses a technique for authenticating the validity of a plain text program read into a computer, by exclusive OR'ing the plain text of the program with a key to generate a code word which must be a standard recognizable code word which is successfully compared with a standard corresponding code word stored in the computer. If there is a successful compare, then the plain text program is considered to be authenticated and is allowed to run, otherwise the program is not allowed to run.

OBJECTS OF THE INVENTION

It is therefore an object of the invention to provide an improved software cryptographic apparatus and method which will accommodate interrupts and branches.

It is a further object of the invention to provide an improved software cryptographic apparatus and method which will accommodate relocatable code operations for encrypted programs.

It is still a further object of the invention to provide an improved software cryptographic apparatus and method which will adapt program execution for a mixture of encrypted and nonencrypted code.

It is yet a further object of the invention to encrypt and decrypt a plurality of instructions as a group, on a continuous basis.

SUMMARY OF THE INVENTION

These and other objects, features and advantages of the invention are accomplished by the improved software cryptographic apparatus and method disclosed herein. The apparatus and method enables the encryption of the object code of a program so as to enable relocatable code operations. The apparatus and method will adapt program execution for a mixture of encrypted and nonencrypted code. A particular advantage of the apparatus and method is its accommodation of interrupts and branches while continuously carrying out the cryptographic function.

DESCRIPTION OF THE FIGURES

These and other objects, features and advantages of the invention will be more fully appreciated with reference to the accompanying figure.

FIG. 1 is a functional block diagram of the improved software cryptographic apparatus.

DISCUSSION OF THE PREFERRED EMBODIMENT

An improved software cryptographic apparatus and method are disclosed. The apparatus and method enable the encryption of the object code of a program so as to enable relocatable code operations. The apparatus and method will adapt program execution for a mixture of encrypted and nonencrypted code. A particular advantage of the apparatus and method is its accommodation of interrupts and branches while carrying out the cryptographic function.

Programs which are to be run on the system are structured programs wherein a single point entry and exit is provided in each definable program segment and each such segment is headed by a header ($S_i$). Each program instruction consists of the standard portions for example an op code and an operand address field. Each program instruction is encrypted using a key which is unique to the definable program segment within which that instruction exists. One principle of the invention is that a separate key kernel is associated with each definable program segment and the key bit stream generated by the corresponding key kernel can be exclusive OR'ed with the bit stream of program instructions in the definable program segment to yield the plain text program for execution within the system.

The apparatus shown in FIG. 1 carries out this operation of decrypting the encrypted program. At initial program load time the encrypted program is loaded into the program store 4 and at the same time the corresponding set of key kernels are loaded into the key kernel store 8. In the illustration provided in FIG. 1, there are three single entry points for three definable program segments labeled respectively S1, S2 and S3 and thus there are three key kernels labeled K1, K2 and K3 which are respectively loaded into the key kernel store 8. The instruction sequencer 7 will progress sequentially through the program stored in the program store 4 and an encrypted program bit stream will be output on line 10 to a first input of exclusive OR 14. While the first definable program segment from P0 to P3 is being output on line 10, the key kernel store is outputting the first key kernel K1 to the key generator 11 which generates a key bit stream of bits whose time of arrival on line 12 to a second input to the exclusive OR 14 is synchronous with the time of arrival of the corresponding bits in the encrypted program bit stream on line 10. By exclusive OR'ing the key bit stream on line 12 with the encrypted program bit stream on line 10, a plain text bit stream is output from the exclusive OR 14. This plain text bit stream is passed through the serial-to-parallel converter 16 so as to provide bytes or words of plain text program on line 17 to the arithmetic logic unit 18 for execution of the program.

In the example shown in FIG. 1, the instruction P2 is a conditional branch instruction to either the program instruction P4 or the program instruction P6. The program instruction P4 has a single entry point which begins a second definable program segment P4 to P5 and has the header designation S2, and similarly the program instruction P6 is the single definable entry point for a third program segment headed by the header S3. If the conditional branch statement in program instruction P2 directs the program to the program instruction P4, then the second key kernel K2 must be output from the key kernel store 8. The branch detector 20 having its input connected to the plain text program output from the exclusive OR 14, detects when a branch instruction such as instruction P2, has occurred. The branch detector 20 then strips out the destination address for the starting point of the definable program segment being branched to, and loads it into the destination program address register 24. The corresponding new key address is then output from the new key address decoder 26 over the line 28 to the key kernel store 8. This results in the key kernel store 8 outputting the second key kernel K2 corresponding to the second program segment header S2, to the key generator 11. The key generator 11 then begins generating a new key bit stream on line 12 corresponding to the encrypted program bit stream on line 10 for the second definable program segment starting at P4 and continuing through P5. The exclusive OR 14 then is able to output the plain text program on line 17 to the arithmetic logic unit 18, even though the continuity of the encrypted character of the first program segment from P0 through P2 has been interrupted by the system branching to the second definable program segment from P4 to P5.

In a similar manner, if the conditional branch at P2 were to the destination program instruction P6, then the kernel K3 would be output from the kernel store 8 to the key generator 11.

In this manner, the improved software cryptographic apparatus and method will accommodate interrupt in branches while still maintaining the encrypted character of the program so as to prevent unauthorized users from understanding the program.

Relocatable code operations are carried out by providing a base plus displacement address feature in the operand address portion of the program instructions. In addition, mixtures of encrypted and nonencrypted code can be accommodated by including in the header for nonencrypted programs, and a control flag indicating no encryption.

Although a specific embodiment of the invention has been disclosed, it will be understood by those of skill in the art that the foregoing and other changes in form and details may be made therein without departing from the spirit and the scope of the invention.

Having thus described out invention, what we claim as new, and desire to secure by Letters Patent is:

1. An improved software cryptographic apparatus in a data processing system including a program storage addressed by an instruction sequencer and an arithmetic logic unit for executing instructions accessed from the program storage, comprising:

a key kernel store having a plurality of N storage locations for N key kernels, each said key kernel being an initial value of a deciphering sequence corresponding to one of a plurality of N definable sequential program segments stored in said program storage, each said program segment being a plurality of consecutive ones of said instructions;

a key generator having an input connected to the output of said key kernel storage and having a key bit stream output, for operating on one of said plurality of key kernels and generating a sequence of key bits corresponding to said one of said plurality of key kernels output from said key kernel storage;

an exclusive OR gate having a first input connected to said encrypted program bit stream line and a second input connected to said key bit stream line, for carrying out an exclusive OR function between corresponding bits from said encrypted program bit stream and from said key bit stream so as to produce a plain text program output;

said arithmetic logic unit having its control input connected to said output from said exclusive OR;

a branch instruction detector having an input connected to the output of said exclusive OR, for detecting the occurrence of a branch instruction from said program storage and outputting the destination address of the definable program segment to be branched to;

said instruction sequencer having a branch control input connected to the output of said branch detector;

a key address decoder having an input connected to the output of said branch detector and an output connected to an address input of said key kernel storage, for accessing the key kernel stored in said key kernel storage which corresponds to the destination address of the program instruction which is at the head of the definable program segment to which the program is branching;

said key kernel storage outputting in response to said key address decoder, a second key kernel to said key generator, which corresponds to said destination address of said second definable program segment, for generating a second key bit stream corresponding to the encrypted program bit stream output from said program storage upon accessing said second definable program segment;

whereby an encrypted program can be continuously decrypted while branching and interrupt operations occur.

2. An improved software cryptographic apparatus in a data processing system including a program storage addressed by an instruction sequencer and an arithmetic logic unit for executing instructions accessed from the program storage, comprising:

a key kernel store having a plurality of M storage locations for M key kernels, each said key kernel being an initial value of a deciphering sequence corresponding to one or more of a plurality of N definable sequential program segments stored in said program storage where N is greater than M, each said program segment being a plurality of consecutive ones of said instructions;

a key generator having an input connected to the output of said key kernel storage and having a key bit stream output, for operating on one of said plurality of key kernels and generating a sequence of key bits corresponding to said one of said plurality of key kernels output from said key kernel storage;

an exclusive OR gate having a first input connected to said encrypted program bit stream line and a second input connected to said key bit stream line, for carrying out an exclusive OR function between corresponding bits from said encrypted program bit stream and from said key bit stream so as to produce a plain text program output;

said arithmetic logic unit having its control input connected to said output from said exclusive OR;

a branch instruction detector having an input connected to the output of said exclusive OR, for detecting the occurrence of a branch instruction from said program storage and outputting the destination address of the definable program segment to be branched to;

said instruction sequencer having a branch control input connected to the output of said branch detector;

a key address decoder having an input connected to the output of said branch detector and an output connected to an address input of said key kernel storage, for accessing the key kernel stored in said key kernel storage which corresponds to the destination address of the program instruction which is at the head of the definable program segment to which the program is branching;

said key kernel storage outputting in response to said key address decoder, a second key kernel to said key generator, which corresponds to said destination address of said second definable program segment, for generating a second key bit stream corresponding to the encrypted program bit stream output from said program storage upon accessing said second definable program segment;

whereby an encrypted program can be continuously decrypted while branching and interrupt operations occur.

3. An improved software cryptographic method in a data processing system including a program storage addressed by an instruction sequencer and an arithmetic logic unit for executing instructions accessed from the program storage, comprising the steps of:

storing N key kernels in a key kernel store having a plurality of N storage locations, each said key kernel being an initial value of a deciphering sequence corresponding to one of a plurality of N definable sequential program segments stored in said program storage, each said program segment being a plurality of consecutive ones of said instructions;

operating on one of said plurality of key kernels and generating a sequence of key bits corresponding to said one of said plurality of key kernels output from said key kernel storage, in a key generator having an input connected to the output of said key kernel storage and having a key bit stream output;

carrying out an exclusive OR function between corresponding bits from said encrypted program bit stream and from said key bit stream so as to produce a plain text program output, in an exclusive OR gate having a first input connected to said encrypted program bit stream line and a second input connected to said key bit stream line;

said arithmetic logic unit having its control input connected to said output from said exclusive OR;

detecting the occurrence of a branch instruction from said program storage and outputting the destination address of the definable program segment to be branched to, in a branch instruction detector having an input connected to the output of said exclusive OR;

said instruction sequencer having a branch control input connected to the output of said branch detector;

accessing the key kernel stored in said key kernel storage which corresponds to the destination address of the program instruction which is at the head of the definable program segment to which the program is branching, in a key address decoder having an input connected to the output of said branch detector and an output connected to an address input of said key kernel storage;

outputting from said key kernel storage in response to said key address decoder, a second key kernel to said key generator, which corresponds to said destination address of said second definable program segment, and generating a second key bit stream corresponding to the encrypted program bit stream output from said program storage upon accessing said second definable program segment;

whereby an encrypted program can be continuously decrypted while branching and interrupt operations occur.

* * * * *